(12) United States Patent
Machida et al.

(10) Patent No.: US 8,508,474 B2
(45) Date of Patent: Aug. 13, 2013

(54) POSITION DETECTING DEVICE

(75) Inventors: Naoyuki Machida, Tokyo (JP); Akihiro Kitaguchi, Tokyo (JP); Shigenori Shibue, Tokyo (JP); Yoshinori Asamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 854 days.

(21) Appl. No.: 12/071,361

(22) Filed: Feb. 20, 2008

(65) Prior Publication Data

US 2009/0040178 A1     Feb. 12, 2009

(30) Foreign Application Priority Data

Aug. 10, 2007   (JP) ................... 2007-209168

(51) Int. Cl.
   *G06F 3/033*   (2013.01)
(52) U.S. Cl.
   USPC ............................. 345/158; 345/156; 345/87
(58) Field of Classification Search
   USPC .................................................. 345/156–158
   See application file for complete search history.

(56) References Cited

U.S. PATENT DOCUMENTS

| | | | | |
|---|---|---|---|---|
| 5,138,304 A | * | 8/1992 | Bronson | ................... 345/157 |
| 5,611,611 A | | 3/1997 | Ogino et al. | |
| 5,818,421 A | * | 10/1998 | Ogino et al. | ................... 345/157 |
| 5,926,168 A | * | 7/1999 | Fan | ................... 345/158 |
| 6,000,668 A | | 12/1999 | Mannick | |
| 6,229,601 B1 | * | 5/2001 | Hasegawa | ................. 356/141.5 |
| 6,339,748 B1 | * | 1/2002 | Hiramatsu | ................... 702/159 |
| 6,664,528 B1 | * | 12/2003 | Cartlidge et al. | .......... 250/208.1 |
| 6,814,449 B2 | * | 11/2004 | Yamada et al. | ................. 353/74 |
| 2002/0084980 A1 | | 7/2002 | White et al. | |
| 2002/0097222 A1 | | 7/2002 | Nishino | |
| 2003/0002033 A1 | * | 1/2003 | Boman | ................... 356/139.03 |
| 2006/0072076 A1 | | 4/2006 | Smoot et al. | |
| 2007/0001942 A1 | * | 1/2007 | Johnson et al. | ................. 345/81 |

FOREIGN PATENT DOCUMENTS

| | | | |
|---|---|---|---|
| CN | 1120286 A | | 4/1996 |
| CN | 1289086 A | | 3/2001 |
| CN | 1444088 A | | 9/2003 |
| CN | 1550039 A | | 11/2004 |
| CN | 1550039 A | * | 11/2004 |
| CN | 1856816 A | | 11/2006 |
| CN | 1856816 A | * | 11/2006 |
| CN | 1896919 A | | 1/2007 |
| CN | 1952851 A | | 4/2007 |
| EP | 0 933 721 A1 | | 8/1999 |
| JP | 8-95157 A | | 4/1996 |

(Continued)

*Primary Examiner* — Amare Mengistu
*Assistant Examiner* — Jennifer Zubajlo
(74) *Attorney, Agent, or Firm* — Birch, Stewart, Kolasch & Birch, LLP

(57) ABSTRACT

An object of the present invention is to provide a position detecting device that allows simultaneous use by a plurality of users by recognizing positional information about a plurality of pointers and associating the pointers and the users. A position detecting device of the invention includes a rear projector that projects an image, a projection screen that displays the image projected from the rear projector, imaging means that is located near the rear projector and that takes an image of light rays emitted from pointers, from the rear of the projection screen, and coordinate calculating means that analyzes the image taken by the imaging means to detect the two-dimensional positions in the detection areas where the light rays from the pointers are detected.

14 Claims, 9 Drawing Sheets

(56) References Cited

FOREIGN PATENT DOCUMENTS

| | | | |
|---|---|---|---|
| JP | 08095157 A | * | 4/1996 |
| JP | 2000-172444 A | | 6/2000 |
| JP | 2002-259040 A | | 9/2002 |
| JP | 2004-5171 A | | 1/2004 |
| JP | 2005-267500 A | | 9/2005 |
| WO | WO-97/06506 A2 | | 2/1997 |

* cited by examiner

F I G . 1
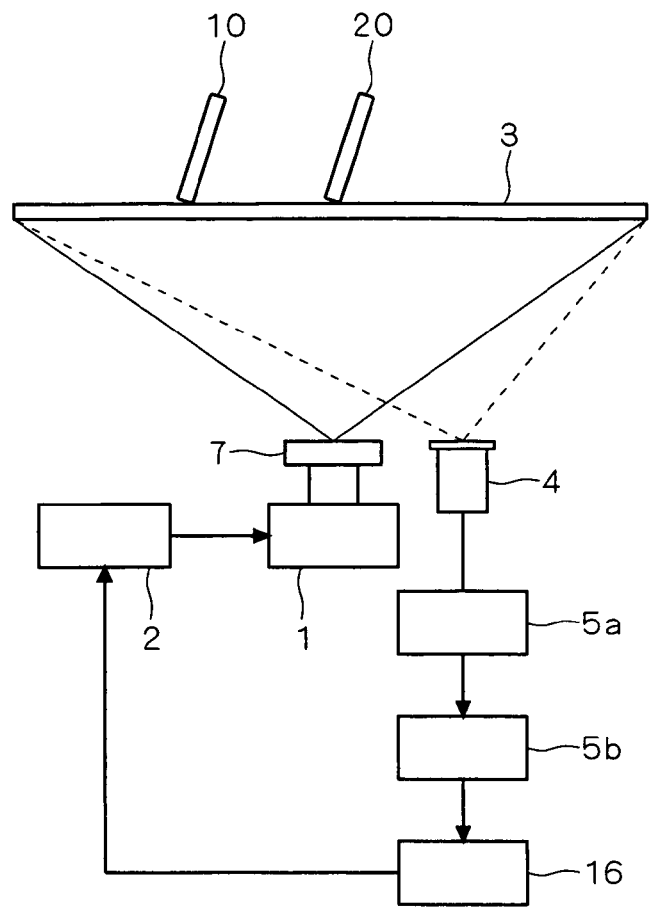
F I G . 2
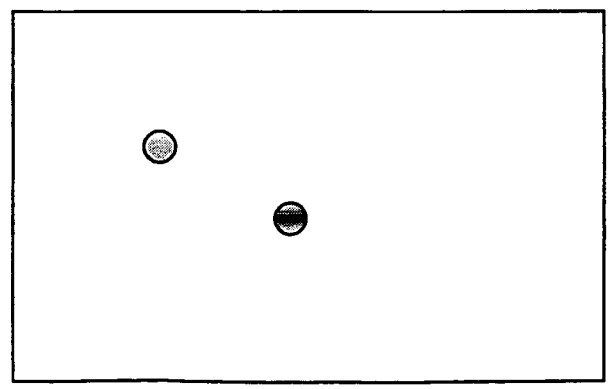

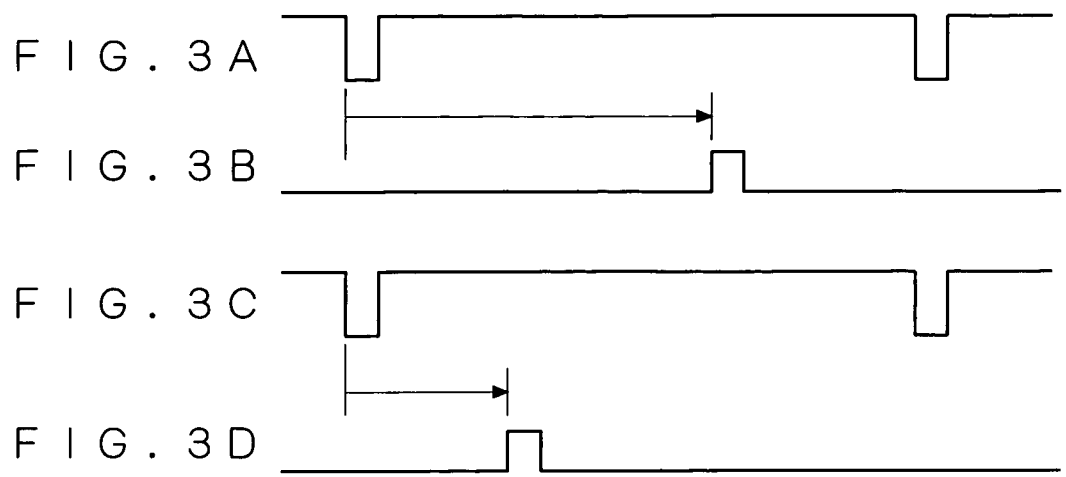
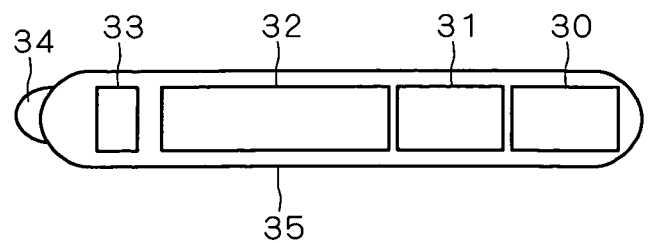
FIG. 4

F I G . 6
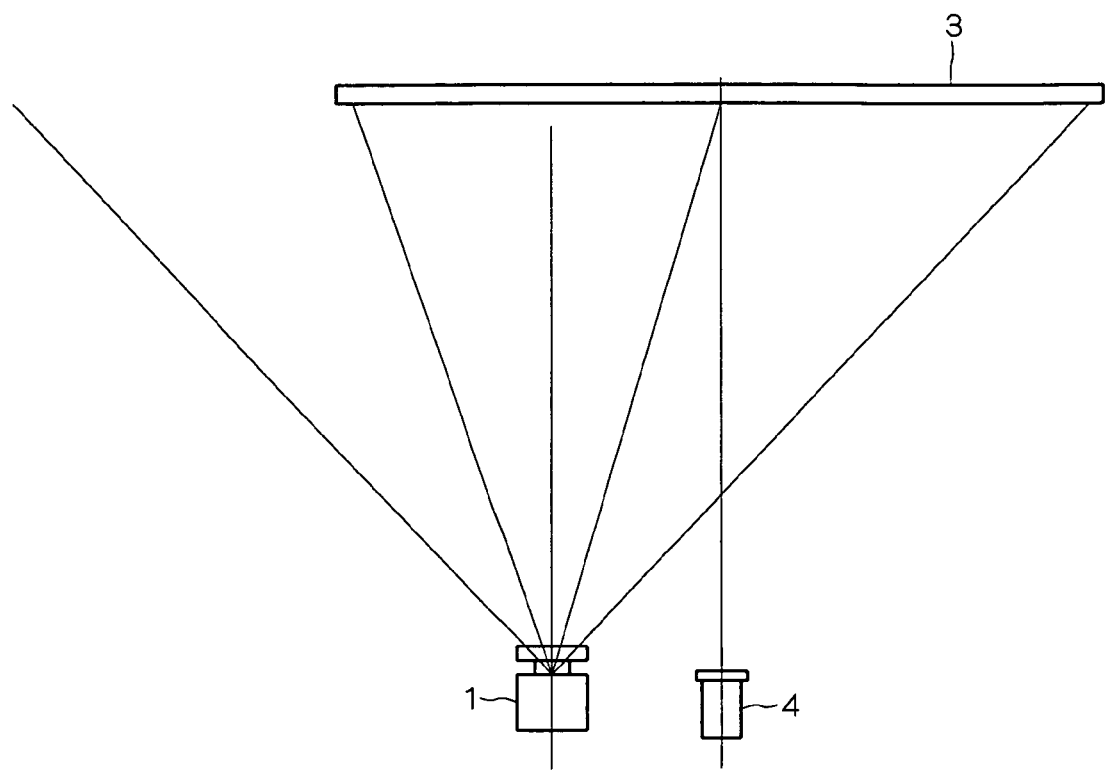

F I G . 1 3
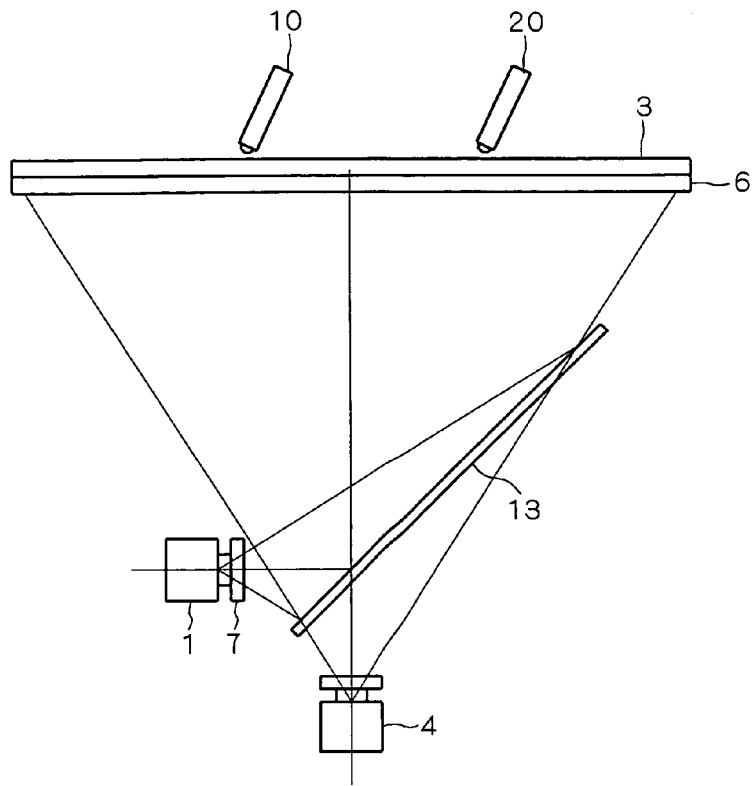
F I G . 1 4
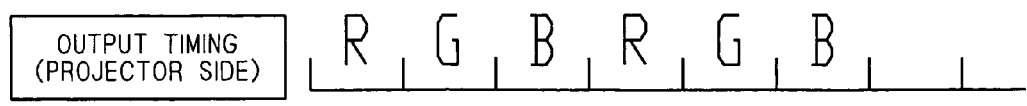
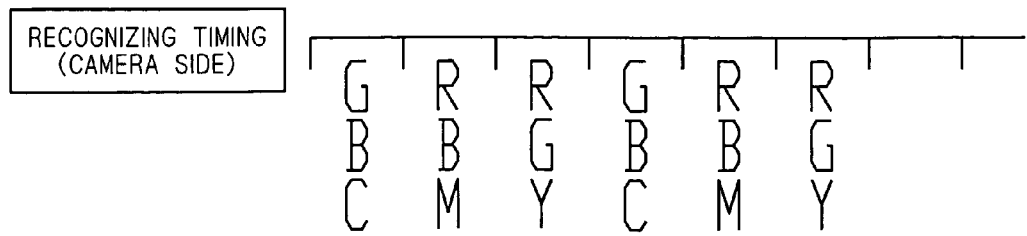

POSITION DETECTING DEVICE

BACKGROUND OF THE INVENTION

1. Field of the Invention

The present invention relates to a position detecting device that can be used by a plurality of users at the same time.

2. Description of the Background Art

A conventional optical position detecting device attached to a display includes a transparent input panel disposed over the display screen surface, and optical sensor units disposed at the side of the input panel surface. The optical sensor units are located on both sides near the upper edge of the display device, and they emit and receive scanning light in a parallel plane at a given distance from the input panel. A retro-reflection member is provided around the input panel to retro-reflect the light emitted from the optical sensor units. When a finger or a specialized pen points at a point on the display screen, an image processing means performs analysis with the retro-reflected light received at the optical sensor units, so as to calculate the pointed coordinate position (for example, see Japanese Patent Application Laid-Open No. 2004-5171).

The position detecting device described above is capable of recognizing a single user, but is incapable of recognizing a plurality of users when used by two or more users.

SUMMARY OF THE INVENTION

An object of the present invention is to provide a position detecting device that allows simultaneous use by a plurality of users by recognizing positional information about a plurality of pointers and associating the pointers and the users.

According to a position detecting device of the present invention, a rear projector projects an image, a projection screen displays the image projected from the rear projector, imaging means is located near the rear projector and takes an image of the light emitted from a pointer, from a rear side of the projection screen, and coordinate calculating means analyzes the image taken by the imaging means to detect the two-dimensional position in a detection area where the light from the pointer is detected.

Thus, simultaneous use by a plurality of users is made possible by recognizing positional information about a plurality of pointers and associating the pointers and the users.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram illustrating the configuration of a position detecting device according to a first preferred embodiment of the present invention;

FIG. 2 is a diagram showing an example of an image taken according to the first preferred embodiment of the present invention;

FIGS. 3A to 3D are diagrams showing an example of calculation of coordinates according to the first preferred embodiment of the present invention;

FIG. 4 is a diagram illustrating the configuration of a pointer according to the first preferred embodiment of the present invention;

FIG. 6 is a diagram showing an example of a method of projection according to the first preferred embodiment of the present invention;

FIG. 13 is a diagram illustrating the configuration of a position detecting device according to a third preferred embodiment of the present invention; and FIG. 14 is a diagram illustrating the operation of a position detecting device according to a fourth preferred embodiment of the present invention.

DESCRIPTION OF THE PREFERRED EMBODIMENTS

Figure 5:
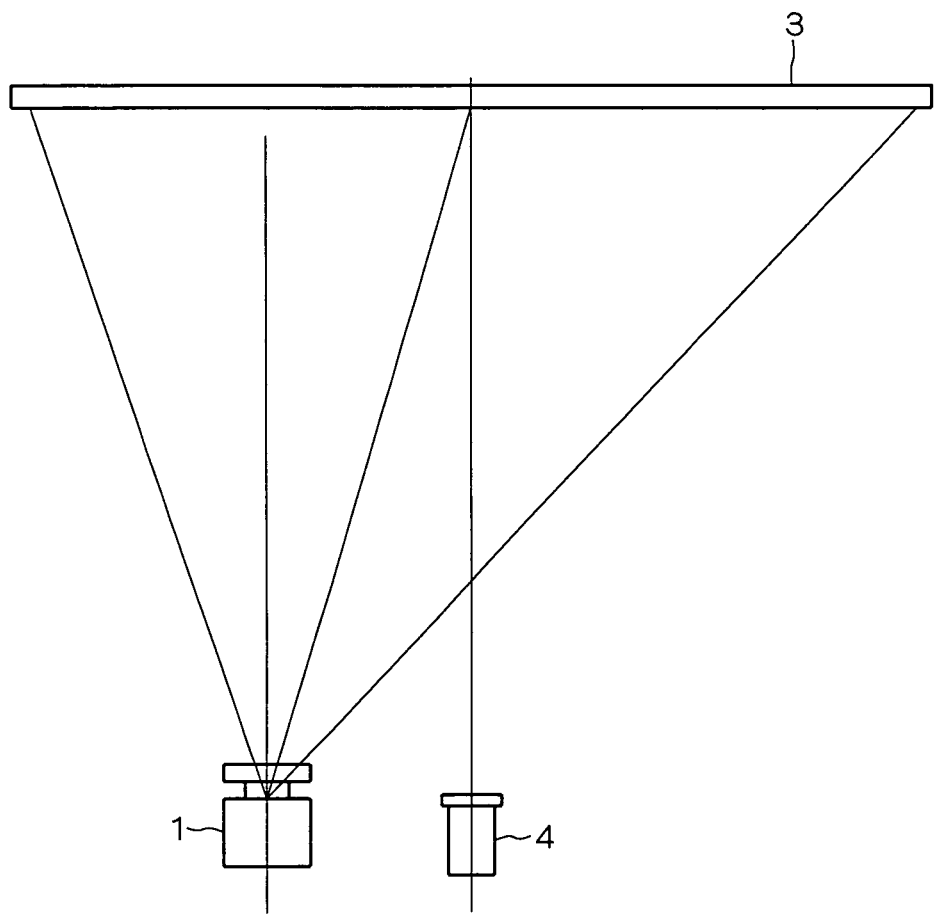
FIG. 5 is a diagram showing an example of a method of projection according to the first preferred embodiment of the present invention.

The preferred embodiments of the present invention will now be described referring to the drawings.

First Preferred Embodiment

FIG. 1 is a diagram illustrating the configuration of a position detecting device according to a first preferred embodiment of the present invention. The first preferred embodiment of the invention describes a method to recognize two pointers, with each pointer using RGB light-emitting diodes as the light source.

As shown in FIG. 1, a projector 1 has a projection lens 7, and it receives image information sent from a computer 2 and projects the image onto a projection screen 3. A first pointer 10 and a second pointer 20 each have built-in light-emitting diodes of three colors including red, blue and green, and the first and second pointers 10 and 20 emit light to point from the front side of the projection screen 3. For example, the first pointer 10 turns on only the red light-emitting diode to emit red light, and the second pointer 20 turns on only the green light-emitting diode to emit green light. A camera 4 (imaging means) is located near the projector 1. From the rear of the projection screen 3, the camera 4 takes an image of an area including the image projected by the projector 1. That is, the camera 4 takes an image of the light rays emitted from the first pointer 10 and the second pointer 20 from the rear of the projection screen 3. FIG. 2 is a diagram showing an example of the image taken by the camera 4 of the preferred embodiment of the invention. As shown in FIG. 2, a point of red light emitted from the first pointer 10 and a point of green light emitted from the second pointer 20 are obtained.

As to the arrangement of the projector 1 and the camera 4 of the position detecting device shown in FIG. 1, the projection lens 7 and the camera 4 would originally be located on the center axis of the projection screen 3 such that the camera 4 can take the image projected from the projector 1 onto the projection screen 3. However, then the projector 1 and the camera 4 physically interfere with each other. Accordingly, the projector 1 is located approximately on the center axis of the projection screen 3, and the camera 4 is positioned in an approximately forward/rearward direction with respect to the projector 1 in such a range that the angles of view of the projector 1 and the camera 4 involve no interference between the projection area of the projector 1 and the body of the camera 4, or no interference between the imaging area of the camera 4 and the body of the projector 1.

Because of the restriction of the arrangement of the projector 1 and the camera 4, it will be necessary to set the imaging area of the camera 4 larger than the required area. Then, the imaging area of the camera 4 includes an unnecessary portion, and the effective pixels of the camera 4 cannot be fully utilized. Accordingly, in order to make the best use of the effective pixels of the camera 4 (in order to minimize the unnecessary imaging area of the camera 4), it is necessary to appropriately set the relation between the aspect ratio of the image projection from the projector 1 and the device aspect ratio of the camera 4. For example, the deterioration of the resolution of the camera 4 can be minimized by setting the aspect ratio of the camera 4 at approximately 4:3 when the aspect ratio of the projector 1 is approximately 16:9, and by setting the aspect ratio of the camera 4 at approximately 5:4 when the aspect ratio of the projector 1 is approximately 4:3. Also, when the camera 4 is positioned in an approximately forward/rearward direction with respect to the projector 1, the device aspect ratio of the camera 4 can be set approximately equal to the projected image aspect ratio of the projector 1 by using a decentered camera, whereby the resolution of the camera 4 can be utilized effectively.

The image signal taken by the camera 4 is inputted to a color recognition circuit 5a, and the signal outputted from the color recognition circuit 5a is inputted to a coordinate calculating circuit 5b (coordinate calculating means). The coordinate calculating circuit 5b detects the two-dimensional coordinate positions of the two light points that were emitted from the first pointer 10 and the second pointer 20 and imaged by the camera 4. FIGS. 3A to 3D are diagrams showing an example of the calculation of coordinates of the first preferred embodiment of the invention. FIG. 3A shows a horizontal synchronizing signal outputted from the camera 4. FIG. 3B shows a signal of red outputted from the camera 4. As can be seen from FIGS. 3A and 3B, the horizontal position of the first pointer 10 can be specified by obtaining the time from the reference position of the horizontal synchronizing signal to the position of the red signal from the first pointer 10. FIG. 3C shows a vertical synchronizing signal outputted from the camera 4. FIG. 3D shows a signal of red outputted from the camera 4. As can be seen from FIGS. 3C and 3D, the vertical position of the first pointer 10 can be specified by obtaining the time from the reference position of the vertical synchronizing signal to the position of the red signal from the first pointer 10. The two-dimensional position of the first pointer 10 can thus be specified by this calculation. The position of the second pointer 20 can also be specified in the same way. Thus, it is possible to detect the individual pointers even when two pointers are used.

The pointers of the preferred embodiment of the invention contain built-in three-color light-emitting diodes of red, blue and green, and therefore an unlimited number of color combinations are basically possible by selecting the colors of light from the pointers. However, it is preferable to use colors like red, blue, green, cyan, magenta, yellow and white to achieve enhanced detecting accuracy. Also, when the screen 3 warps in the direction in which its own weight works and the accuracy of detection of two-dimensional position coordinates deteriorates, a warpage preventing member 6 (see FIGS. 8, 9 and 13) can be disposed below the screen 3 so that the two-dimensional position coordinates of the pointers can be specified accurately.

The camera 4 might be unable to distinguish between the light rays from the pointers 10 and 20 and unnecessary light produced as the image projected from the projector 1 onto the screen 3 is reflected at the plane of incidence of the screen 3 or the warpage preventing member 6. It is therefore necessary to apply some anti-reflection to the plane of incidence of the screen 3 or the warpage preventing member 6. Also, in order to prevent problems like breakage, contamination and small flaws of the screen 3 when the pointers 10 and 20 are freely moved in contact with the screen 3, it is more effective to provide, on the upper surface of the screen 3, a material that is highly abrasion-resisting and highly reinforcing and capable of reducing or diffusing reflections of external light.

FIG. 4 is a diagram illustrating the configuration of a pointer of the first preferred embodiment of the invention. As shown in FIG. 4, the pointer includes a power supply 30, a switch 31 for setting the color of light emission, a driver 32 for driving light-emitting diodes, three-color light-emitting diodes 33, a lens 34 for efficiently outputting the light emitted from the light-emitting diodes, and a case 35 for accommodating the components. The pointer of this preferred embodiment has no power-supply switch, and battery consumption can be reduced by configuring the pointer so that it is powered on only when pressed against the screen 3.

The positional information about each pointer outputted from the coordinate calculating circuit 5b is inputted to the computer 2 through an external I/F 16 such as LAN, USB, etc. Using the inputted recognition information and positional information, the computer 2 controls the operation of application software installed therein.

The information inputted to the computer 2 may include not only the recognition information and positional information but also other information obtained as the pointer is pressed or as the radiation area etc. of visible light (invisible light) is changed.

When the number of users is limited, e.g. when the number of users is two, cost reduction can be achieved by using two-color light-emitting diodes, with the camera 4 composed of two monochrome cameras, instead of one color camera, in which case filters that only transmit colors assigned to the individual pointers are provided in front of the respective cameras.

As to the arrangement of the projector 1 and the camera 4, in the method shown in FIG. 5, the camera 4 is located approximately on the center axis of the projection screen 3, and the projector 1 is positioned in approximately forward/rearward, left/right directions with respect to the approximate center axis of the projection screen 3, and the projector 1 provides decentered projection onto the projection screen 3. In another method, as shown in FIG. 6, the camera 4 is located approximately on the center axis of the projection screen 3, and the projector 1 is positioned in approximately forward/rearward, right/left directions with respect to the approximate center axis of the projection screen 3, and the projector 1 provides regular projection (projection with no decentering) with over-scanning onto the projection screen 3 in such a way that the image is displayed only on the projection screen 3. These arrangement schemes, too, offer the effects described above.

Figure 7:
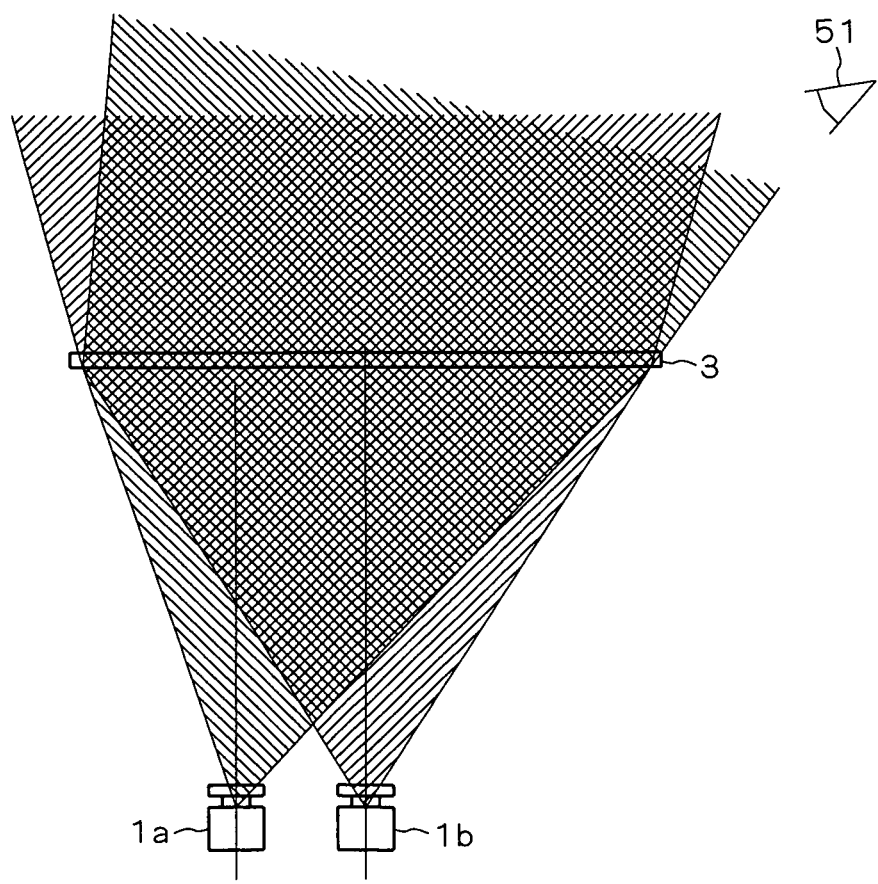
FIG. 7 is a diagram showing an example of a method of projection according to the first preferred embodiment of the present invention.

FIG. 7 is a diagram showing an arrangement in which the projector 1 is placed in such a position that a screen observer 51 can see a brighter image. As shown in FIG. 7, when the screen observer 51 (viewer) sees the image from a position shifted right or left from the center axis of the projection screen 3, the screen observer 51 can see a brighter image when a projector 1a is located as shown in the diagram, than when a projector 1b is located on the center axis of the projection screen 3. That is, the projector 1a is located in a position shifted from the center axis of the projection screen 3 such that the optical axis of the projected image is directed toward the screen observer 51.

In this preferred embodiment, the projector 1 and the camera 4 are disposed separately. Alternatively, the camera 4 may be built in the projector 1 so as to avoid physical interference between the projector 1 and the camera 4, and so as to allow the projector 1 and the camera 4 to be positioned on the center axis of the projection screen 3.

Thus, information about the positions of pointers is detected by using light rays emitted from light-emitting diodes of the pointers, whereby not only the positions of the pointers but also the pointers used by the users can be specified. This makes it possible to accurately obtain information about the pointers even when a plurality of users simultaneously use respective pointers.

Second Preferred Embodiment

In this preferred embodiment, characteristically, a plurality of invisible light emitting diodes with different wavelengths are used as the light sources of the pointers. In other respects, the configuration and operation are the same as those of the first preferred embodiment.

Figure 8:
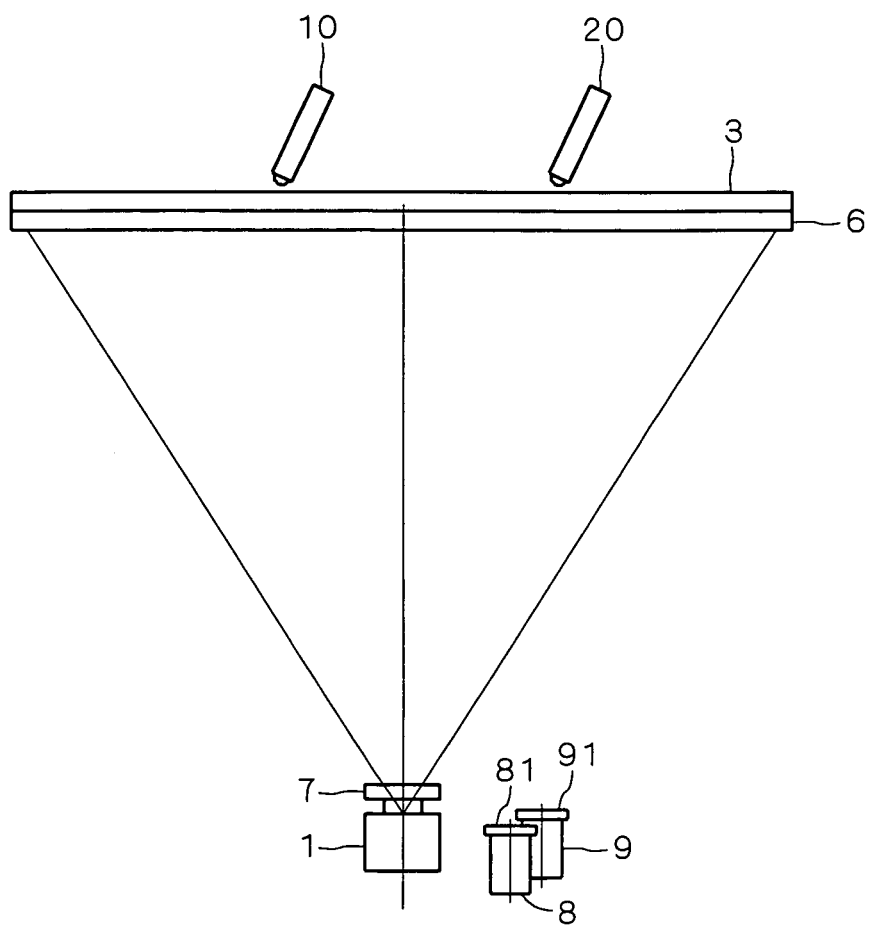
FIG. 8 is a diagram illustrating the configuration of a position detecting device according to a second preferred embodiment of the present invention.
Figure 9:
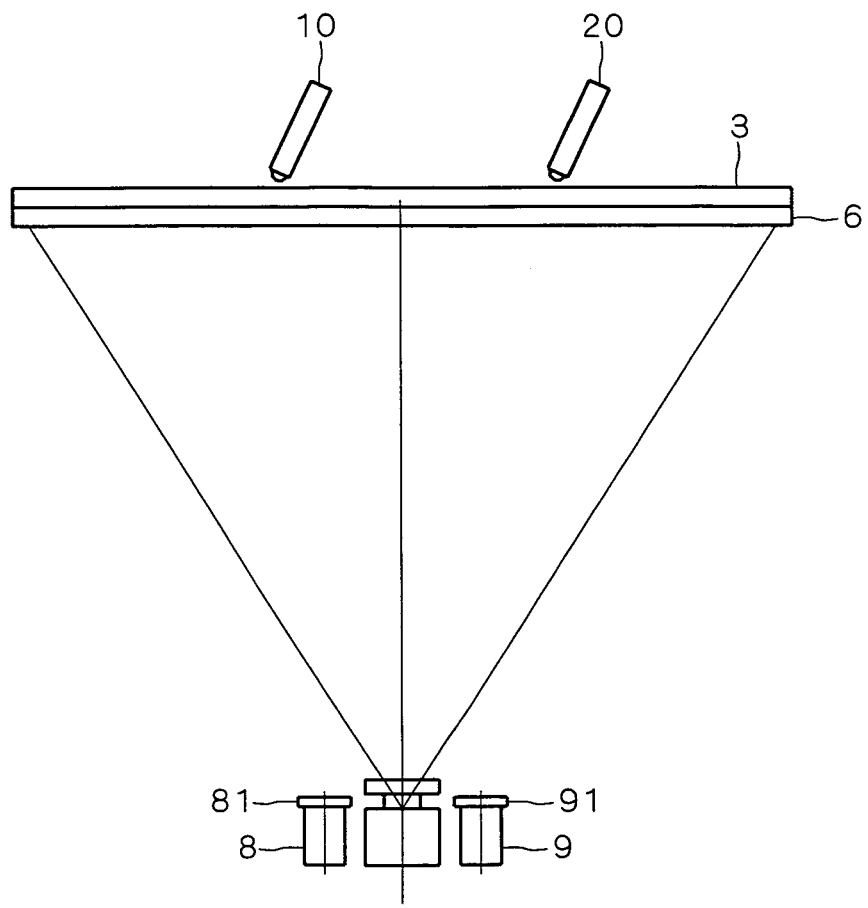
FIG. 9 is a diagram illustrating the configuration of a position detecting device according to the second preferred embodiment of the present invention.

FIGS. 8 and 9 are diagrams illustrating possible configurations of the position detecting device of the second preferred embodiment of the present invention. As shown in FIGS. 8 and 9, a camera 8 and a camera 9 are disposed near a projector 1, so as to take the image of an area including the image projected by the projector 1, from the rear of the projection screen 3. The camera 8 and the camera 9 respectively have a filter 81 and a filter 91 that only transmit the wavelengths of colors assigned respectively to the first pointer 10 and the second pointer 20. It is therefore possible to reduce influences of external light and unnecessary light caused as the image projected from the projector 1 reflects at the projection screen 3, so as to detect only the invisible light rays emitted from particular pointers. This eliminates the need for an anti-reflection member on the plane of incidence of the screen 3 or warpage preventing member 6 as described in the first preferred embodiment.

Figure 10:
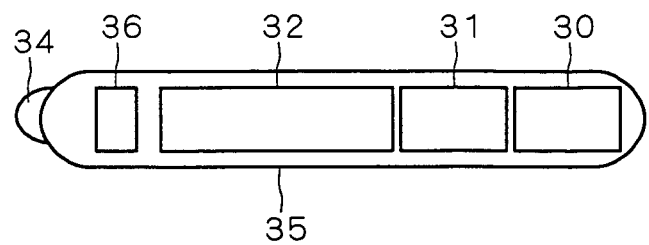
FIG. 10 is a diagram illustrating the configuration of a pointer according to the second preferred embodiment of the present invention.

FIG. 10 is a diagram illustrating the configuration of a pointer according to the second preferred embodiment of the invention. The pointer of FIG. 10 has invisible light emitting diodes 36, and in other respects it is configured in the same way as those used in the first preferred embodiment. A first pointer 10 and a second pointer 20 have built-in light-emitting diodes that emit invisible light rays at arbitrarily selected two different wavelengths (referred to as 1 and 2 here). For example, when the first pointer 10 turns on the diode for the invisible light 1 only, then the second pointer 20 turns on the diode of the invisible light 2 only. When an increased number of pointers are used, it is necessary to provide invisible light emitting diodes of other different wavelengths, and it is also necessary to provide an increased number of cameras and filters in correspondence with the increased number of pointers.

Figure 11:
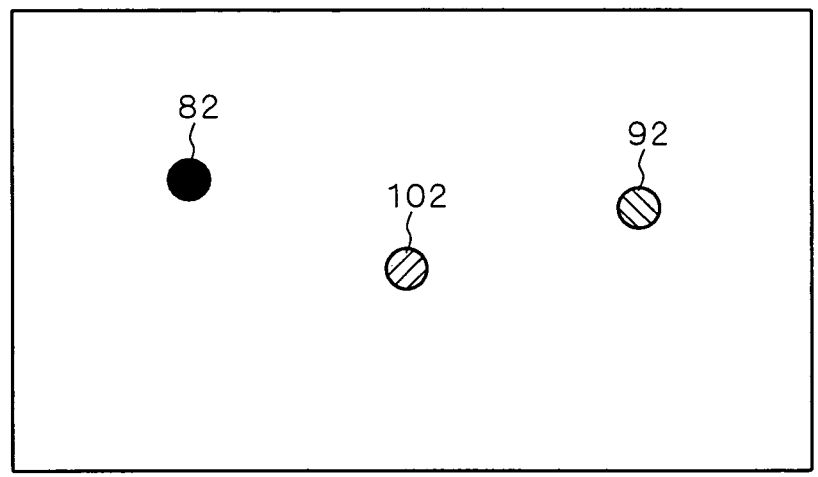
FIG. 11 is a diagram showing an example of an image taken according to the second preferred embodiment of the present invention.

FIG. 11 is a diagram showing an example of the image taken by the camera 8. As shown in FIG. 11, the camera 8 would take an image including a point of invisible light 82 emitted from the first pointer 10, a point of invisible light 92 emitted from the second pointer 20, and a point of unnecessary light 102 caused by the reflection of the image projected from the projector 1 onto the projection screen 3. However, in reality, the image of FIG. 11 includes only the point of invisible light 82 because the camera 8 has the filter 81 in front of it.

Figure 12:
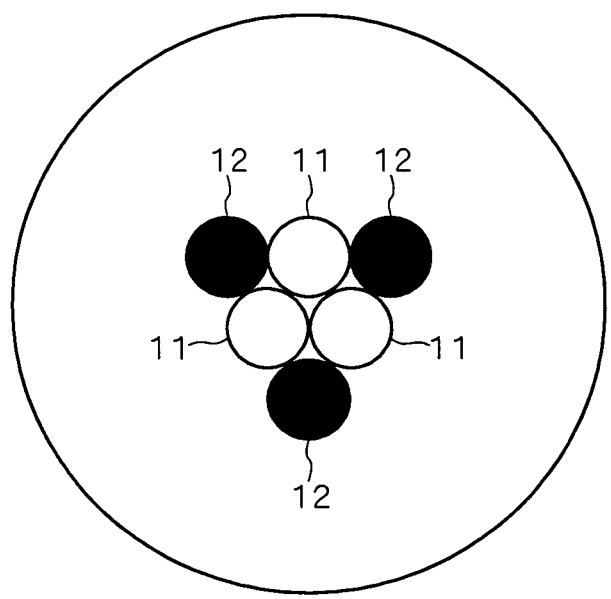
FIG. 12 is a diagram illustrating the configuration of a pointer according to the second preferred embodiment of the present invention.

FIG. 12 is a diagram showing an example of the configuration of a pointer of the second preferred embodiment of the invention. As shown in FIG. 12, the pointer contains a plurality of built-in visible light emitting diodes 12 in correspondence respectively with a plurality of invisible light emitting diodes 11. It is therefore possible to visually recognize the visible light emitting diode that corresponds to the invisible light emitting diode being selected, so as to instantaneously recognize the kind of the pointer that the user is using. A single white light emitting diode may be used in place of the plurality of visible light emitting diodes 12.

This preferred embodiment uses cameras of a number corresponding to the number of pointers. However, when the number of users is limited, e.g. when the number of users is three or less, one 3CCD (or 3CMOS) camera may be used to implement a simpler configuration, with the camera's color-separation block filter characteristics being associated with the three invisible light rays.

Thus, information about the positions of pointers is detected by using light rays emitted from invisible light emitting diodes of the pointers, whereby not only the positions of the pointers but also the pointers used by the users can be specified. This makes it possible to accurately obtain information about the pointers even when a plurality of users simultaneously use respective pointers. Also, because the cameras have filters that transmit particular wavelengths only, it is possible to remove external light and unnecessary light caused by reflections of the image projected from the projector 1 to the projection screen 3.

Third Preferred Embodiment

This preferred embodiment characteristically provides a relatively simple arrangement of the projector 1 and the camera 4 through the use of a bending mirror 13. Invisible light emitting diodes are used as the light sources of pointers. In other respects, the configuration and operation are the same as those of the first preferred embodiment or the second preferred embodiment.

FIG. 13 is a diagram illustrating the configuration of a position detecting device according to a third preferred embodiment of the present invention. As shown in FIG. 13, the bending mirror 13 reflects visible light and transmits invisible light, so that the image projected from the projector 1 is imaged on the projection screen 3, while the invisible light rays emitted from the first pointer 10 and the second pointer 20 pass through the bending mirror 13 to be taken by the camera 4. By arranging the projector 1 and the camera 4 in this way, the projection lens 7 of the projector 1 and the camera 4 can be disposed approximately on the center axis of the projection screen 3. Accordingly, the function of correcting distortions due to the lens of the camera 4, which is necessary to precisely specify the two-dimensional coordinates of pointers, can be implemented with a relatively simple correcting function.

This preferred embodiment uses the bending mirror 13 that reflects visible light and transmits invisible light, but the same effects are obtained by using a bending mirror that reflects invisible light and transmits visible light.

Thus, the use of the bending mirror 13 simplifies the configuration of the position detecting device, and the aspect ratio of image projection of the projector 1 and the device aspect ratio of the camera 4 can be set approximately equal, allowing effective use of the resolution of the camera 4.

Fourth Preferred Embodiment

This preferred embodiment provides another method, different from the formation of anti-reflection member described in the first preferred embodiment, to distinguish between light rays emitted from the pointers and unnecessary light caused by reflections of the image projected from the projector 1 to the projection screen 3. This method controls the image output timing of the projector 1 and the timing by which the camera 4 recognizes pointers. In other respects, the configuration and operation are the same as those of the first preferred embodiment.

FIG. 14 is a diagram illustrating the operation of the position detecting device of a fourth preferred embodiment of the invention. As shown in FIG. 14, the projector 1 provides a three-color image output of RGB in a time-division manner. The timing by which the camera 4 recognizes the first pointer 10 and the second pointer 20 is controlled according to the image output timing of the projector 1 so that unnecessary light and light rays emitted from the pointers can be distinguished from each other. For example, according to the timing by which the projector 1 outputs red (R), the camera 4 recognizes blue (B), green (G) and cyan (C), not containing red (R) component, emitted from the pointers. Also, according to the timing by which the projector 1 outputs blue (B), the camera 4 recognizes red (R), green (G) and yellow (Y), not containing blue (B) component, emitted from the pointers.

When the light source of the projector 1 has no "OFF" timing, such as a DC-driven lamp, "OFF" timing may be provided arbitrarily. Also, "OFF" timing may be included in the image, not with a lamp, to provide the same effect.

Thus, by precisely recognizing a color other than that outputted from the projector 1, it is possible to precisely distinguish between the light emitted from the pointer and unnecessary light caused by reflections of the image projected from the projector 1 onto the projection screen 3. Also, the influence of unnecessary light can be completely removed by recognizing the pointers during "OFF" periods of an AC-driven lamp of the light source of the projector 1.

While the invention has been described in detail, the foregoing description is in all aspects illustrative and not restrictive. It is understood that numerous other modifications and variations can be devised without departing from the scope of the invention.

What is claimed is:

1. A position detecting device comprising:
a rear projector that projects an image;
a projection screen that displays the image projected from said rear projector;
imaging means that, from a rear side of said projection screen, takes an image of light emitted from a pointer that points from a front side of said projection screen including the entire image projected on said projection screen by the projector; and
coordinate calculating means that analyzes the image taken by said imaging means to detect a two-dimensional position in a detection area where the light from said pointer is detected,
further comprising a warpage preventing member that prevents warpage of said projection screen, and a treatment for preventing light reflection is applied to a plane of incidence of said warpage preventing member where light from said rear projector is incident.

2. The position detecting device according to claim 1, wherein said pointer includes a plurality of pointers, and said coordinate calculating means detects two-dimensional positions in the detection areas where light rays from said plurality of pointers are detected.

3. The position detecting device according to claim 2, wherein information other than positional information and recognition information about said plurality of pointers is detected as information included in said detection areas.

4. The position detecting device according to claim 2, wherein said imaging means includes a plurality of monochrome imaging means of a number corresponding to the number of said pointers, and said plurality of monochrome imaging means respectively comprise filters that transmit only particular wavelengths corresponding respectively to said pointers.

5. The position detecting device according to claim 1, wherein said imaging means is decentered imaging means, and said rear projector is located approximately on a center axis of said projection screen, and said imaging means is positioned near said rear projector in such a way that no interference occurs between said imaging means and said rear projector.

6. The position detecting device according to claim 1, wherein said imaging means takes an image of an area larger than an actually required imaging area, and said rear projector is located approximately on a center axis of said projection screen, and said imaging means is positioned near said rear projector in such a way that no interference occurs between said imaging means and said rear projector.

7. The position detecting device according to claim 6, wherein an unnecessary area imaged by said imaging means is minimized by setting a proper combination of aspect ratios of said rear projector and said imaging means.

8. The position detecting device according to claim 1, wherein said rear projector is located in a position shifted from a center axis of said projection screen in such a way that an optical axis of the projected image is directed toward a viewer.

9. The position detecting device according to claim 1, wherein said pointer has a light source of invisible light.

10. The position detecting device according to claim 9, wherein said pointer has a built-in light source of visible light associated with said invisible light emitted from said pointer.

11. The position detecting device according to claim 9, further comprising a bending mirror that reflects visible light and transmits invisible light.

12. The position detecting device according to claim 9, further comprising a bending mirror that reflects invisible light and transmits visible light.

13. The position detecting device according to claim 1, wherein said imaging means is built in said rear projector.

14. The position detecting device according to claim 1, wherein an image output timing of said rear projector and an imaging timing of said imaging means are controlled such that light of the image projected from said rear projector and the light emitted from said pointer can be distinguished from each other.

\* \* \* \* \*